United States Patent [19]
Fredrickson

[11] Patent Number: 5,799,996
[45] Date of Patent: Sep. 1, 1998

[54] MULTI-FUNCTION HAND TOOL

[76] Inventor: David F. Fredrickson, 4951 Toll Bridge Rd., Belton, Tex. 76513

[21] Appl. No.: 804,133

[22] Filed: Feb. 20, 1997

[51] Int. Cl.[6] .................... A01B 1/20; B25F 1/02
[52] U.S. Cl. .................... 294/51; 7/114; 172/375; 294/57; 294/58; 294/60
[58] Field of Search .................... 294/1.1, 19.1, 294/22–24, 49, 51, 52, 57–60; 7/114–116; 15/105, 144.3; 56/400.04, 400.07; 172/373–375; 206/372–375

[56] References Cited

U.S. PATENT DOCUMENTS

| 576,756 | 2/1897 | Cole .................... 294/57 X |
| 1,411,435 | 4/1922 | Hosmer .................... 294/58 X |
| 1,464,353 | 8/1923 | Crinella .................... 294/51 |
| 1,530,225 | 3/1925 | Belakoy .................... 294/57 X |
| 2,796,011 | 6/1957 | Schmidt .................... 294/52 X |
| 4,146,969 | 4/1979 | Chaires . |
| 4,162,132 | 7/1979 | Kress et al. .................... 294/51 X |
| 4,203,495 | 5/1980 | Crownover . |
| 4,476,939 | 10/1984 | Wallace . |
| 4,606,089 | 8/1986 | King . |
| 4,700,420 | 10/1987 | Belanger .................... 294/51 X |
| 4,786,095 | 11/1988 | Dumont .................... 294/51 |
| 5,348,360 | 9/1994 | Mencarelli et al. .................... 294/57 |
| 5,499,852 | 3/1996 | Seigendall . |
| 5,606,772 | 3/1997 | Ilic . |

*Primary Examiner*—Johnny D. Cherry
*Attorney, Agent, or Firm*—Merek & Voorhees

[57] ABSTRACT

A multi-function hand tool includes a handle assembly (20) comprising a plurality of handle segments (22, 32, 42) selectively connectible end to end to provide a handle having a length appropriate for the function to be performed. The handle assembly further includes a counterweight (52), a D-type handle (62), and various adaptors (72, 82, 92) whereby the handle assembly may be configured to the performance of a specific function. The multi-function hand tool further comprises a plurality of tool heads (100, 110, 120, 130, 140, 150, 160, 170, 190, 200, 210) which are selectively engageable with the handle assembly to configure the multi-function hand tool to the performance of a desired function.

17 Claims, 4 Drawing Sheets

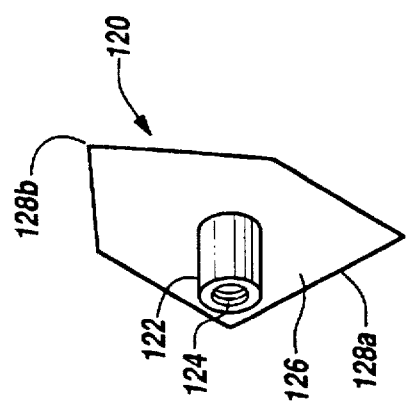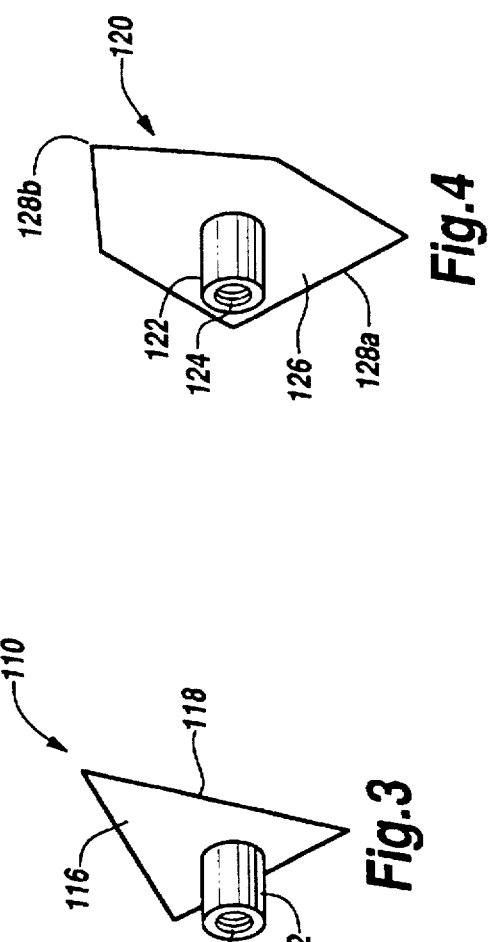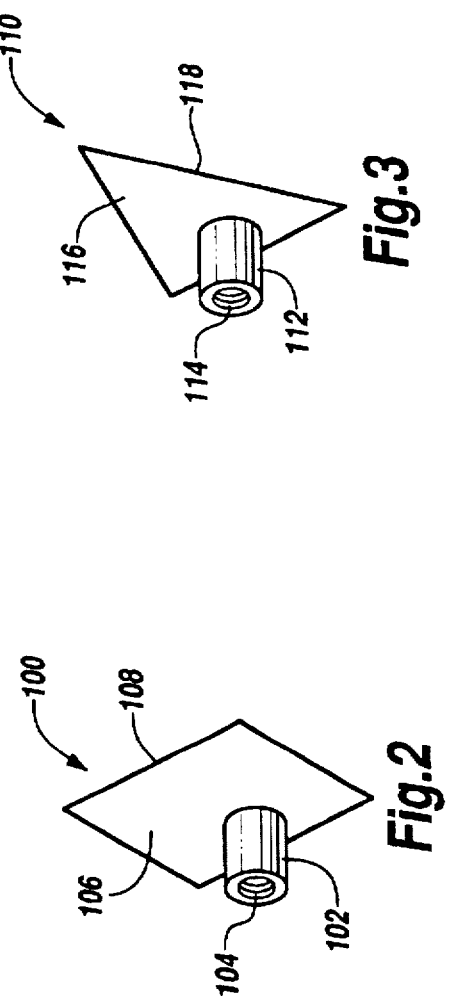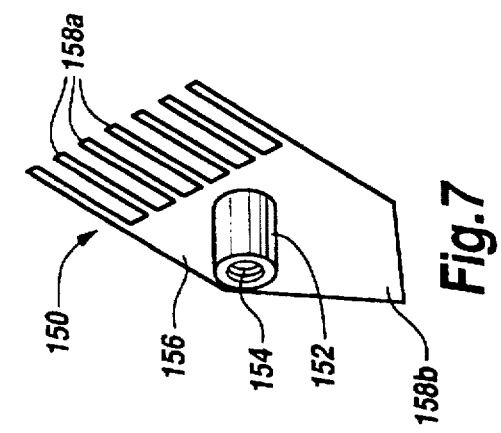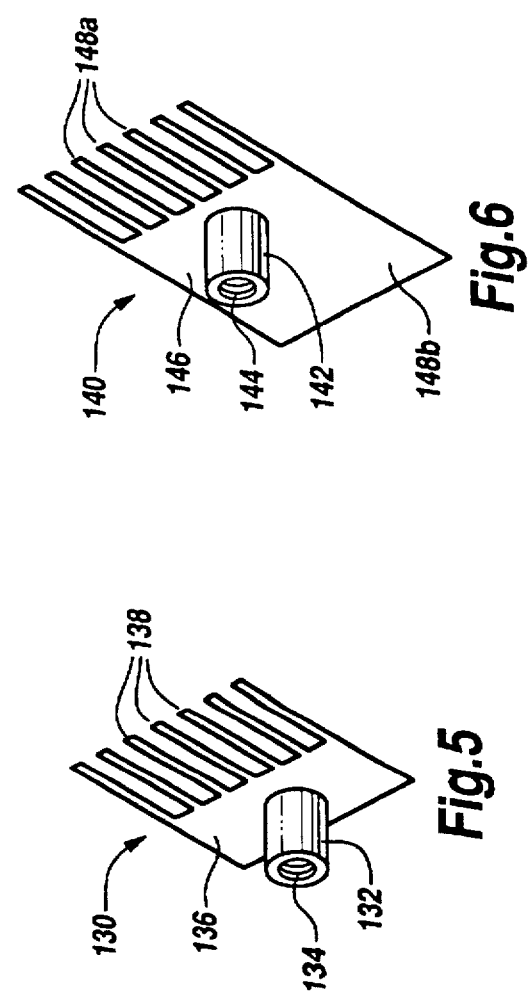

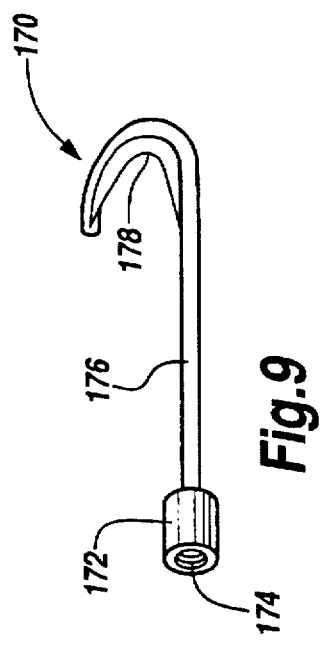
Fig.9
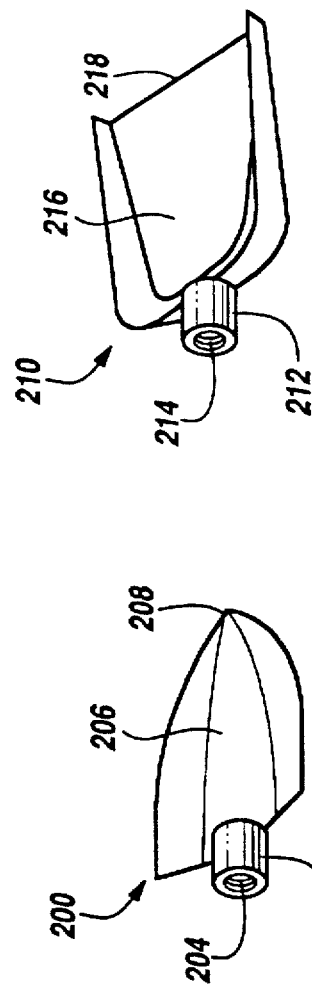
Fig.12
Fig.11
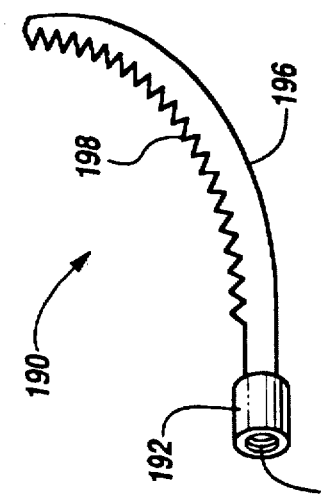
Fig.8
Fig.10

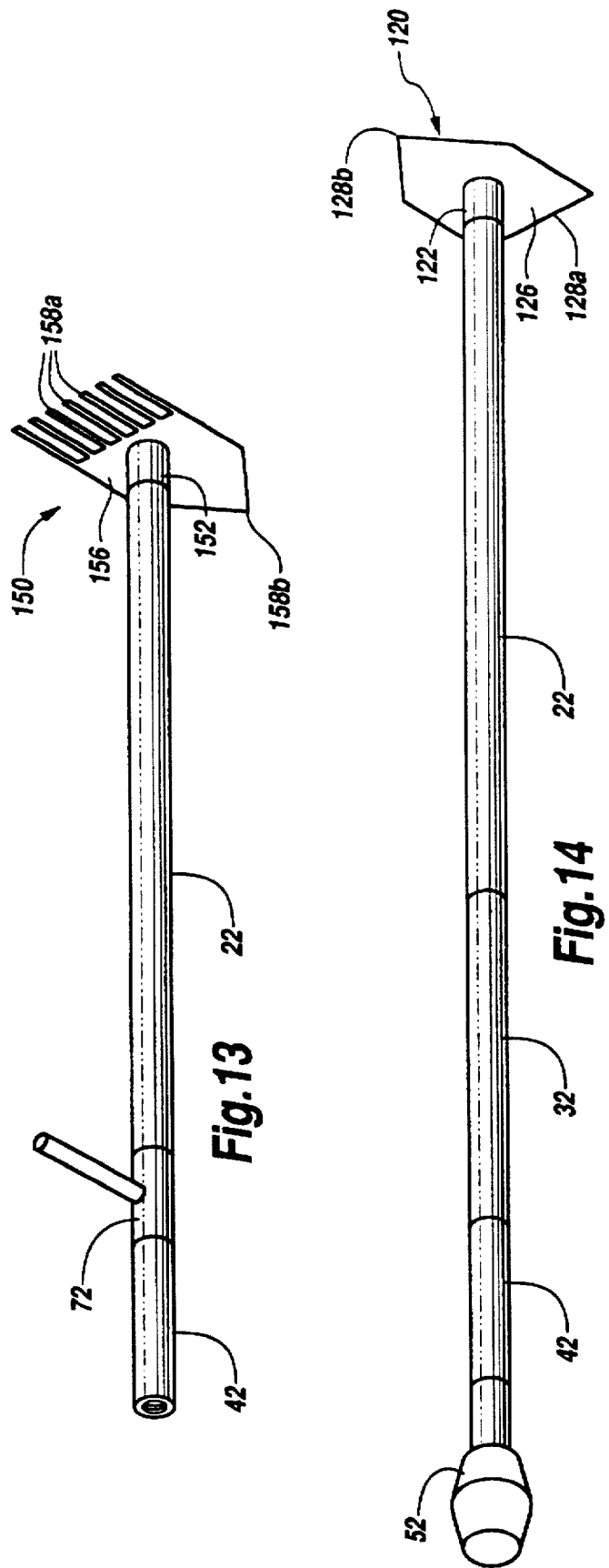
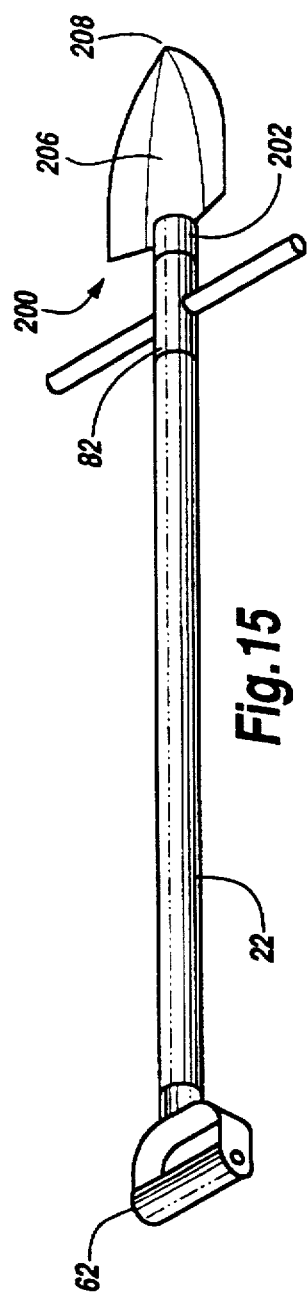

MULTI-FUNCTION HAND TOOL

TECHNICAL FIELD

This invention relates generally to hand tools, and more particularly to a hand tool adapted to perform a wide variety of functions.

BACKGROUND AND SUMMARY OF THE INVENTION

Hand tools have been used literally for centuries to perform a wide variety of tasks, including digging, shoveling, hoeing, cultivating, chopping, cutting, raking, etc. In the past, the practice has been to provide a multiplicity of tools each specially designed and adapted to the performance of one particular function. Few if any attempts have been made to provide a single tool readily adapted to the performance of the foregoing and other hand tool operations.

Those skilled in the art will understand that it is often prohibitively expensive and unduly burdensome to purchase and store a multiplicity of hand tools, each of which may be used only occasionally. Even when such considerations are not paramount, the mere availability of a multiplicity of hand tools does not necessarily solve every problem. For example, the available tools may not have appropriate handles or other features which, if available, would simplify the task at hand. Thus, a need exists for improvements in the art of hand tool design.

The present invention comprises a hand tool which overcomes the foregoing and other problems long since associated with the prior art. In accordance with one aspect of the invention, a hand tool is provided with a handle assembly comprising a plurality of handle sections each different in length from the remaining sections. The handle sections are selectively engageable one with the other, thereby providing a hand tool having a handle length which is precisely suited to the task at hand. The handle further includes a counterbalancing weight, a D-type grip for use at the end of the handle, and single or double laterally extending grips positionable either at the end of the handle or at an intermediate point thereof when additional pushing or pulling force is required.

The handle is adapted for use with a plurality of tool heads each selectively engageable with the handle to perform a specific task. In many instances, the tool head is adapted to the performance of a variety of functions, for example, cultivating and raking, cutting and raking, etc. In this manner, the hand tool of the present invention is adapted to the completion of an entire task, such as cultivating and smoothing the soil, cutting and removal of extraneous vegetation, etc., without the necessity of either changing tools or changing the tool head.

In use, the hand tool of the present invention is both practical and economical. Thus, the necessity of purchasing and storing a multiplicity of hand tools each having its own handle and tool head is eliminated. Additionally, the use of the present invention eliminates the necessity of changing back and forth between two or more tools in order to initiate and then complete a particular task.

BRIEF DESCRIPTION OF THE DRAWINGS

A more complete understanding of the invention may be had by reference to the following Detail Description when taken in conjunction with the accompanying Drawings, wherein:

FIG. 2 is an illustration of a first tool head comprising the multi-function hand tool of the present function;

FIG. 3 is an illustration of a second tool head comprising the multi-function hand tool of the present invention;

FIG. 4 is an illustration of a third tool head comprising the multi-function hand tool of the present invention;

FIG. 5 is an illustration of a fourth tool head comprising the multi-function hand tool of the present invention;

FIG. 6 is an illustration of a fifth tool head comprising the multi-function hand tool of the present invention;

FIG. 7 is an illustration of a sixth tool head comprising the multi-function hand tool of the present invention;

FIG. 8 is an illustration of a seventh tool head comprising the multi-function hand tool of the present invention;

FIG. 9 is an illustration of a eighth tool head comprising the multi-function hand tool of the present invention;

FIG. 10 is an illustration of a tenth tool head comprising the multi-function hand tool of the present invention;

FIG. 11 is an illustration of a eleventh tool head comprising the multi-function hand tool of the present invention;

FIG. 12 is an illustration of a twelfth tool head comprising the multi-function hand tool of the present invention;

FIG. 13 is a perspective view of certain of the component parts of the multi-function hand tool of the present invention configured to provide a combination cultivator and narrow rake having a handle including a laterally extending grip;

FIG. 14 is a perspective view illustrating certain of the component parts of the multi-function hand tool of the present invention configured to provide a combination hoe and cultivator having an elongated handle; and FIG. 15 is a perspective view of certain of the component parts of the multi-function hand tool of the present invention configured to provide a spade having a handle including a D-type handle at one end and having laterally extending grips adapted for actuation by the feet of the operator.

DETAILED DESCRIPTION

Figure 1:
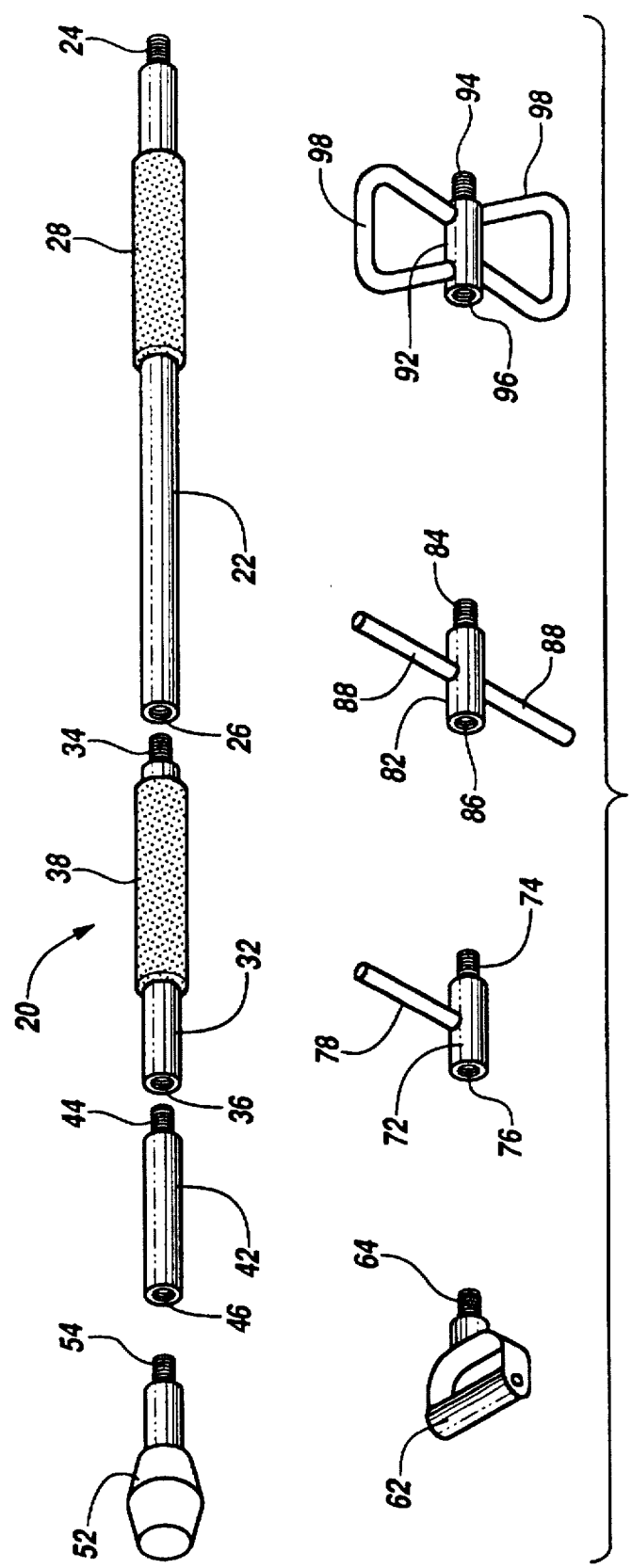
FIG. 1 is a diagrammatical illustration of the handle assembly of the multi-function hand tool of the present invention.

Referring now to the Drawings, and particularly to FIG. 1, the multi-function hand tool of the present invention includes a handle assembly 20. The handle assembly 20 includes a long handle segment 22 having a male attachment component 24 at one end and a female attachment component 26 at the other end, an intermediate handle segment 32 having a male attachment component 34 at one end and a female attachment component 36 at the other end; and a short handle segment 42 having a male attachment component 44 at one end and a female attachment component 46 at the other end. As illustrated in the drawings, the attachment components 24, 26, 34, 36, 44, and 46 of the handle assembly 20 comprise threaded attachment components; however, it will be understood that other well-known attachment component types, including bayonet-type attachment components, pin and slot-type attachment components, etc., may be used in the practice of the invention if desired.

By way of example, the long handle segment 22 of the handle assembly 20 may have a length of 4 feet, the intermediate handle segment 32 may have a length of 2 feet, and the short handle segment 42 may have a length of 1 foot. The male attachment components 24, 34, and 44 are identical as are the female attachment components 26, 36, and 46. Thus, the handle components 22, 32, and 42 may be selectively interconnected to provide a handle having a length of 1 foot, 2 feet, 3 feet, 4 feet, 5 feet, 6 feet, or 7 feet in accordance with the requirements of particular applications and uses of the multi-function hand tool comprising the invention.

The handle segment 22 may be provided with a grip 28, if desired. Likewise, the handle segment 32 may be provided with a grip 38, if desired. The grips 28 and 38 may be formed from cloth, plastic or plastic foam. The purpose of the grips 28 and 38 is to provide thermal insulation, vibration damping, and a more effective gripping surface.

The handle assembly 20 further comprises a counterweight 52 which may be used to afford balance to the multi-function hand tool of the present invention. The counterweight 52 has a male attachment component 54 at one end thereof which is selectively engageable with any of the female attachment components, 26, 36, or 46 of the handle segments 22, 32, or 42, respectively. The handle assembly 20 further includes a D-type handle 62 comprising a configuration commonly used in many hand tools. The handle 62 has a male attachment component 64 at one end thereof which is adapted for selective engagement with the female attachment component 26, 36, 46 of the handle segments 22, 32, or 42, respectively, to provide a convenient handle at one end of the multi-function hand tool of the present invention.

The handle assembly 20 further comprises an adaptor 72 having a male attachment component 74 at one end thereof and a female attachment component 76 at the opposite end thereof; an adaptor 82 having a male attachment component 84 at one end thereof and a female attachment 86 at the opposite end thereof; and an adaptor 92 having a male attachment component 94 at one end thereof and a female attachment component 96 at the opposite end thereof. The male attachment components 74, 84, and 94 are identical to the male attachment components 24, 34, and 44 of the handle segments 22, 32, 42, and the female attachment components 76, 86, and 96 are identical to the female attachment components 26, 36, and 46 of the handle segments 22, 32, and 42. Thus, the adaptors 72, 82, and 92 may be positioned at either end of or between any of the handle segments by simply engaging the male attachment component and/or the female attachment component of the selected adaptor with the appropriate male attachment component and/or female attachment component of one or more of the handle segments 22, 32, and 42. The adaptor 72 has a single grip 78 extending from one side thereof which may be utilized to effect pushing or pulling of the multi-function hand tool of the present invention. The adaptor 82 has grips 88 extending from the opposite sides thereof, either or both of which may be utilized to effect pushing or pulling of the multi-function hand tool of the present invention. The adaptor 92 has ring-shaped grips 98 positioned on opposite sides thereof, either or both of which may be utilized to effect pushing or pulling of the multi-function hand tool of the present invention.

FIGS. 2 through 12, inclusive, illustrate tool heads comprising the multi-function hand tool of the present invention. Any of the tool heads illustrated in FIG. 2 through 12, inclusive, may be utilized in conjunction with any of the component parts of the handle assembly 20 illustrated in FIG. 1 to provide a hand tool particularly adapted to the performance of a particular function.

Referring now to FIG. 2, there is shown a tool head 100 comprising a hoe. The tool head 100 includes a body 102 having a female attachment component 104 located at one end thereof. A blade 106 is mounted at the opposite end of the body 102 and is secured thereto by welding or by means of appropriate fasteners. The blade 106 is characterized by a linear working edge 108.

The female attachment component 104 of the tool head 100 is identical to the female attachment components 26, 36, and 46 of the handle segments 22, 32, and 42 and is also identical to the female attachment components 76, 86, and 96 of the adaptors 72, 82, and 92. Thus, the female attachment component 104 of the tool head 100 is adapted for engagement with any of the male attachment components 24, 34, or 44 of the handle segments 22, 32, or 42 and is likewise adapted for mating engagements by the male attachment components 74, 84, and 94 of the adaptors 72, 82 and 92. Thus, in the use of the multi-function hand tool of the present invention, the tool 100 may be situated at the end of a handle comprising one or more of the component parts of the handle assembly 20 of FIG. 1 and actuated thereby to perform the desired function.

Referring now to FIG. 3 there is shown a tool head 110 comprising a pointed hoe or cultivator. The tool head 110 includes a body 112 having a female attachment component 114 formed at one end thereof. A blade 116 is secured to the opposite end of the body 112 by welding or by means of appropriate fasteners. The blade 116 is characterized by a pointed working edge 118. In use, the tool head 110 is secured to a handle made up from selected components comprising the handle assembly 20 by engaging the female attachment component 114 of the tool head 110 with one of the male attachment components 24, 34, 44, 64, 74, 84, or 94 of the handle assembly. The handle is then used to actuate the tool head 110 to perform the desired function.

Referring now to FIG. 4, there is shown a combination tool head 120 comprising a hoe and a cultivator. The tool head 120 includes a body 122 having a female attachment component 124 formed at one end thereof. A blade 126 is secured to the opposite end of the body 122 by welding or by means of appropriate fasteners. The blade 126 is characterized by a hoe portion 128A and a cultivator 128B extending in opposite directions from the tool body 122. In use, the tool head 120 is secured to a handle made up from selected components comprising the handle assembly 20 by engaging the female attachment component 124 of the tool head 120 with one of the male attachment components 24, 34, 44, 64, 74, 84, or 94 of the handle assembly. The handle is then used to actuate the tool head 120 to perform the desired function.

Referring now to FIG. 5, there is shown a tool head 130 comprising a narrow rake. The tool head 130 includes a body 132 having a female attachment component 134 formed at one end thereof. A blade 136 is secured to the opposite end of the body 132 by welding or by means of appropriate fasteners. The blade 136 is characterized by a plurality of tines 138. In use, the tool head 130 is secured to a handle made up from selected components comprising the handle assembly 20 by engaging the female attachment component 134 of the tool head 130 with one of the male attachment components 24, 34, 44, 64, 74, 84, or 94 of the handle assembly. The handle is then used to actuate the tool head 130 to perform the desired function.

Referring now to FIG. 6, there is shown a combination tool head 140 comprising a narrow rake and a hoe. The tool head 140 includes a body 142 having a female attachment component 144 formed at one end thereof. A blade 146, a rake portion 148A and a hoe portion 148B extending in opposite directions form the body 142. In use, the tool head 140 is secured to a handle made up from selected components comprising the handle assembly 20 by engaging the female attachment component 144 of the tool head 140 with one of the male attachment components 24, 34, 44, 64, 74, 84, or 94 of the handle assembly. The handle is then used to actuate the tool head 140 to perform the desired function.

Referring now to FIG. 7, there is shown a combination tool head 150 comprising a narrow rake and a cultivator. The tool head 150 includes a body 152 having a female attachment component 154 formed at one end thereof. A blade 156 is secured to the opposite end of the body 152 by welding or by means of appropriate fasteners. The blade 156 is characterized by a rake portion 158A and a cultivator portion 158B extending in opposite directions from the body 152. In use, the tool head 150 is secured to a handle made up from selected components comprising the handle assembly 20 by engaging the female attachment component 154 of the tool head 150 with one of the male attachment components 24, 34, 44, 64, 74, 84, or 94 of the handle assembly. The handle is then used to actuate the tool head 150 to perform the desired function.

Referring now to FIG. 8, there is shown a tool head 160 comprising a wide rake. The tool head 160 includes a body 162 having a female attachment component 164 formed at one end thereof. A blade 166 is secured to the opposite end of the body 162 by welding or by means of appropriate fasteners. The blade 166 is characterized by a plurality of tines 168. In use, the tool head 160 is secured to a handle made up from selected components comprising the handle assembly 20 by engaging the female attachment component 154 of the tool head 160 with one of the male attachment components 24, 34, 44, 64, 74, 84, or 94 of the handle assembly. The handle is then used to actuate the tool head 160 to perform the desired function.

Referring now to FIG. 9, there is shown a tool head 170 comprising a brush and vegetation cutter. The tool head 170 includes a body 172 having a female attachment component 174 formed at one end thereof. A blade 176 is secured to the opposite end of the body 172 by welding or by means of appropriate fasteners. The blade 176 is characterized by a cutting edge 178. In use, the tool head 170 is secured to a handle made up from selected components comprising the handle assembly 20 by engaging the female attachment component 174 of the tool head 170 with one of the male attachment components 24, 34, 44, 64, 74, 84, or 94 of the handle assembly. The handle is then used to actuate the tool head 170 to perform the desired function.

Referring now to FIG. 10, there is shown a tool head 190 comprising a saw. The tool head 190 includes a body 192 having a female attachment component 194 formed at one end thereof. A blade 196 is secured to the opposite end of the body 192 by welding or by means of appropriate fasteners. The blade 196 is characterized by saw teeth 198. In use, the tool head 190 is secured to a handle made up from selected components comprising the handle assembly 20 by engaging the female attachment component 194 of the tool head 190 with one of the male attachment components 24, 34, 44, 64, 74, 84, or 94 of the handle assembly. The handle is then used to actuate the tool head 190 to perform the desired function.

Referring now to FIG. 11, there is shown a tool head 200 comprising a spade. The tool head 200 includes a body 202 having a female attachment component 204 formed at one end thereof. A blade 206 is secured to the opposite end of the body 202 by welding or by means of appropriate fasteners. The blade 206 is characterized by a working edge 208. In use, the tool head 200 is secured to a handle made up from selected components comprising the handle assembly 20 by engaging the female attachment component 204 of the tool head 200 with one of the male attachment components 24, 34, 44, 64, 74, 84, or 94 of the handle assembly. The handle is then used to actuate the tool head 200 to perform the desired function.

Referring now to FIG. 12, there is shown a tool head 210 comprising a shovel. The tool head 210 includes a body 212 having a female attachment component 214 formed at one end thereof. A blade 216 is secured to the opposite end of the body 212 by welding or by means of appropriate fasteners. The blade 216 is characterized by a working edge 218. In use, the tool head 210 is secured to a handle made up from selected components comprising the handle assembly 20 by engaging the female attachment component 214 of the tool head 210 with one of the male attachment components 24, 34, 44, 64, 74, 84, or 94 of the handle assembly. The handle is then used to actuate the tool head 210 to perform the desired function. FIG. 13 illustrates certain of the component parts of the multi-function hand tool of the present invention configured to provide a combination narrow rake and cultivator. The hand tool of FIG. 13 comprises a handle comprising the handle segment 22, the adaptor 72, and the handle segment 42. The adaptor 72 provides a laterally extending grip which is useful in applying pushing and pulling forces to the hand tool.

The tool head 150 is secured to the end of the handle segment 22. Thus, the handle of the hand tool of FIG. 13 is operable to engage either the cultivator portion of 158B or the narrow rake portion 158A of the tool head 150 with the soil. For example, the cultivator portion 158B may be used to effect cultivating operations, after which the soil may be smoothed utilizing the narrow rake portion 158A. When the multi-function hand tool of the present invention is used, such operations can be conducted without changing tools.

Referring now to FIG. 14, there is shown a hand tool comprising certain of the component parts of the multi-function hand tool of the present invention configured to provide a combination cultivator and hoe. The hand tool of FIG. 14 comprises a handle made up of the handle segment 22, the handle segment 32, and the handle segment 42. Thus, the handle of the hand tool of FIG. 14 is seven feet in length. The counterweight 52 is mounted at the end of the handle segment 42 and therefore at the end of the hand tool.

At the opposite end of the hand tool, the tool head 120 is secured to the handle segment 22. Thus, the handle may be utilized to operate the tool head 120 to engage the cultivator portion 128B with the soil to effect cultivating operations and may also be rotated 180 degrees to engage the hoe portion 128A with the soil to effect hoeing operations. In many instances, it is desirable to first cultivate and to then smooth the soil, which operations can be accomplished with the multi-function hand tool of the present invention without changing tools.

FIG. 13 illustrates certain of the component parts of the multi-function hand tool of the present invention configured to provide a combination narrow rake and cultivator. The hand tool of FIG. 13 comprises a handle comprising the handle segment 22, the adaptor 72, and the handle segment 42. The adaptor 72 provides a laterally extending grip which is useful in applying pushing and pulling forces to the hand tool.

The tool head 150 is secured to the end of the handle segment 22. Thus, the handle of the hand tool of FIG. 13 is operable to engage either the cultivator portion of 158B or the narrow rake portion 158A of the tool head 150 with the soil. For example, the cultivator portion 158B may be used to effect cultivating operations, after which the soil may be smoothed utilizing the narrow rake portion 158A. When the multi-function hand tool of the present invention is used, such operations can be conducted without changing tools.

FIG. 15 illustrates certain of the is component parts of the multi-function hand tool of the present invention configured to provide a spade. The hand tool of FIG. 15 comprises a handle including the handle segment 22, the D-type handle 62, and the adaptor 82.

The tool head 200 is secured to the adaptor 82. In this manner, the handle of the hand tool, including the handle segment 22 and the D-type handle 62 may be utilized to engage the cutting edge 208 of the blade 206 with the soil to be worked. By positioning the adaptor 82 between the handle segment 22 and the tool head 200, the grips 88 of the adaptor 82 are positioned for engagement by the feet of the operator to impart additional pushing force to the hand tool.

Although preferred embodiments of the invention have been illustrated in the accompanying drawings and described in the foregoing detailed description, it will be understood is not limited to the embodiments disclosed, but is capable of numerous rearrangements, modifications, and substitutions of parts and elements without departing from the description of the invention.

I claim:

1. A hand tool kit, comprising:
   (a) at least first, second and third segments adapted to be selectively connected in end-to-end relationship to form a tool handle assembly, said first, second and third segments being of differing lengths;
   (b) at least first and second tool heads, said first tool head being configured to perform a first function and said second tool head being configured to perform a second function differing from said first function;
   (c) each of said first, second and third segments including connector means for connecting any one of said first, second and third segments to any other one of said first, second and third segments; and
   (d) each of said first and second tool heads including connector means for connecting each of said first and second tool heads to any one of said first, second and third segments.

2. A hand tool kit as set forth in claim 1, further including a tubular counter weight having connector means for connecting said tubular counter weight to any one of said first, second and third segments.

3. A hand tool kit as set forth in claim 1, wherein said first tool head comprises a body, a female threaded connector on a first end of said body and a blade secured to a second end of said body.

4. A hand tool kit as set forth in claim 3, wherein said blade includes a rake portion and a hoe portion extending in opposite directions.

5. A hand tool kit as set forth in claim 3, wherein said blade includes a hoe portion and a cultivator portion.

6. A hand tool kit as set forth in claim 1, wherein said first tool head comprises a body, a female threaded connector on a first end of said body, a blade secured to a second end of said body, said blade having an accurate configuration with a distal edge disposed away from said tool handle assembly and a proximal edge disposed toward said tool handle assembly, said proximal edge having a sharpened portion.

7. A hand tool kit as set forth in claim 6, wherein said second tool head comprises a body, a female threaded connector on a first end of said body, a blade secured to a second end of said body, said blade having an arcuate configuration with a distal edge disposed away from said tool handle assembly and a proximal edge disposed toward said tool handle assembly, said proximal edge having saw teeth disposed thereon.

8. A hand tool kit as set forth in claim 1, wherein said first tool head comprises a shovel and said second tool head comprises a spade.

9. A hand tool kit as set forth in claim 1, wherein said first tool head comprises a hoe and said second tool head comprises a rake.

10. A hand tool kit as set forth in claim 1, wherein one of said first and second tool heads is a combination tool head having more than one tool formed thereon.

11. A hand tool kit as set forth in claim 1, wherein one of said first, second and third segments is a handle having a grip formed from one of the elements consisting of cloth, plastic and foam plastic.

12. A hand tool kit as set forth in claim 1, wherein one of said first, second and third segments is a handle having a D-shaped portion.

13. A hand tool kit as set forth in claim 1, further including an adapter having a male end and a female end for attachment to one or more of said first, second and third segments, said adapter having a grip bar extending perpendicular to a longitudinal axis of said tool handle assembly for grasping with a hand.

14. A hand tool kit as set forth in claim 1, further including an adapter having a male end and a female end for attachment to one or more of said first, second and third segments, said adapter having one or more ring shaped grips extending perpendicular to a longitudinal axis of said tool handle assembly for grasping with a hand or being pushed or pulled by a foot.

15. A hand tool kit, comprising:
   (a) at least first, second and third segments adapted to be selectively connected in end-to-end relationship to form a tool handle assembly, said first, second and third segments being of differing lengths;
   (b) at least first and second tools, said first tool being configured to perform a first function and said second tool being configured to perform a second function differing from said first function;
   (c) each of said first, second and third segments including connector means for connecting any one of said first, second and third segments to any other one of said first, second and third segments; and
   (d) connector means for connecting said first and second tools to any one of said first, second and third segments.

16. A hand tool kit as set forth in claim 15, wherein said first and second tools are formed on a single tool head.

17. A hand tool kit, comprising:
   (a) at least first, second and third segments adapted to be selectively connected in end-to-end relationship to form a tool handle assembly, said first, second and third segments having first and second ends;
   (b) at least first and second tool heads, said first tool head being configured to perform a first function and said second tool head being configured to perform a second function differing from said first function;
   (c) each of said first, second and third segments including connector means at said first and second ends for connecting any one of said first, second and third segments to any other one of said first, second and third segments; and
   (d) a force application segment including an element extending transverse to a longitudinal axis of said force application segment, said element including a surface on which a force may be applied and said force application segment being selectively connected to any of said first, second and third segments.

* * * * *